(12) United States Patent
Herb et al.

(10) Patent No.: US 6,517,240 B1
(45) Date of Patent: Feb. 11, 2003

(54) ULTRASONIC THERMOMETER SYSTEM

(75) Inventors: Glenn T. Herb, Weston, MA (US); Charles Fendrock, Sudbury, MA (US)

(73) Assignee: DuraMetrics, Inc., Sudbury, MA (US)

( * ) Notice: Subject to any disclaimer, the term of this patent is extended or adjusted under 35 U.S.C. 154(b) by 0 days.

(21) Appl. No.: 09/435,188

(22) Filed: Nov. 5, 1999

(51) Int. Cl.⁷ ............................................. G01K 11/22
(52) U.S. Cl. ..................................... 374/117; 374/119
(58) Field of Search ................................ 374/117, 194, 374/163, 208, 113

(56) References Cited

U.S. PATENT DOCUMENTS

| | | | |
|---|---|---|---|
| 3,540,265 A | * | 11/1970 | Lynnworth |
| 3,580,076 A | * | 5/1971 | Mobsby ........................ 73/339 |
| 3,633,423 A | * | 1/1972 | Bell ........................... 73/339 A |
| 3,633,424 A | * | 1/1972 | Lynnworth et al. .......... 73/339 A |
| 3,665,225 A | * | 5/1972 | van den Heuvel et al. ... 310/8.1 |
| 3,717,033 A | * | 2/1973 | Gordon et al. .............. 73/339 A |
| 4,020,692 A | * | 5/1977 | Arave ......................... 73/339 A |
| 4,195,523 A | * | 4/1980 | Tasman et al. .............. 73/339 A |
| 4,249,418 A | * | 2/1981 | Ebata ......................... 73/339 A |
| 4,483,630 A | * | 11/1984 | Varela ........................ 374/119 |
| 4,772,131 A | * | 9/1988 | Varela et al. ................ 374/119 |
| 5,141,331 A | * | 8/1992 | Oehler et al. ............... 374/118 |
| RE34,507 E | * | 1/1994 | Egawa et al. ................ 374/126 |
| 5,420,516 A | * | 5/1995 | Cabot .......................... 324/620 |
| 5,608,356 A | * | 3/1997 | Rupert et al. ................ 331/18 |
| 5,638,396 A | * | 6/1997 | Klimek ....................... 372/92 |
| 5,646,470 A | * | 7/1997 | de Groot ...................... 310/337 |
| 5,793,409 A | * | 8/1998 | Tetsumura ................... 348/1 |
| 5,857,777 A | * | 1/1999 | Schuh ......................... 374/172 |
| 6,047,602 A | * | 4/2000 | Lynnworth ................... 73/632 |
| 6,051,980 A | * | 4/2000 | Divljakovic et al. ......... 324/544 |
| 6,168,063 B1 | * | 1/2001 | Sato et al. .................... 228/1.1 |

FOREIGN PATENT DOCUMENTS

| | | | | |
|---|---|---|---|---|
| JP | 61245031 | * | 10/1986 | ................ 73/570 |
| JP | 02198328 | | 8/1990 | |
| JP | 10090082 | | 4/1998 | |

* cited by examiner

Primary Examiner—Diego Gutierrez
Assistant Examiner—Gail Verbitsky
(74) Attorney, Agent, or Firm—Hale and Dorr LLP

(57) ABSTRACT

The ultrasonic thermometer system of the present invention includes a rod or probe of high temperature, grain-stabilized material that has a magnetostrictive or piezoelectric transducer bonded to one end. The transducer is excited by a transducer driver, creating short, periodic, ultrasonic pulses that travel down the length of the rod in a "pulse-echo" fashion. Along the length of the rod, circumferential grooves are cut which reflect some of the ultrasonic energy back to the transducer thus creating a reflected or echo signal. Two such reflected signals from two adjacent grooves, or a signal from one groove and a signal from the end of the rod, establish a temperature zone. This is the zone of interest to the user, which would be inserted into the user's process that needs to have the temperature monitored. As the temperature of the zone changes, the transition time of the ultrasonic pulse through the zone also changes, thus providing a measurable indication of average temperature and changes in average temperature of the temperature zone. There may be one or multiple temperature zones on one rod. A processor is also provided to correlate the signals generated by the transducer and reflected by the grooves with template signals to generate a temperature reading.

18 Claims, 6 Drawing Sheets

PROBE AND TRANSDUCER ASSEMBLY DETAIL

HEAD SCHEMATIC DIAGRAM

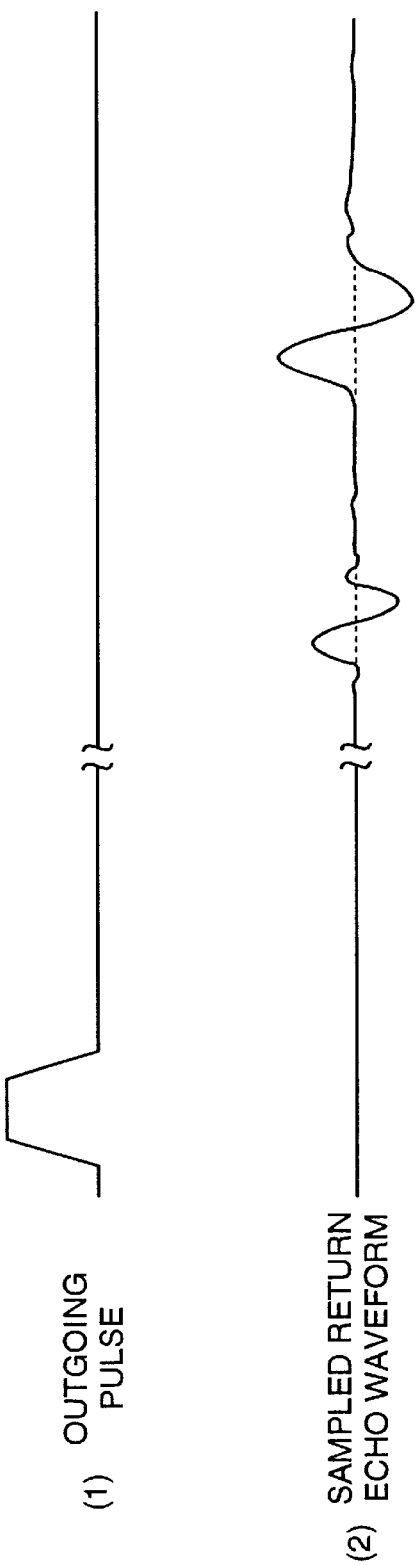
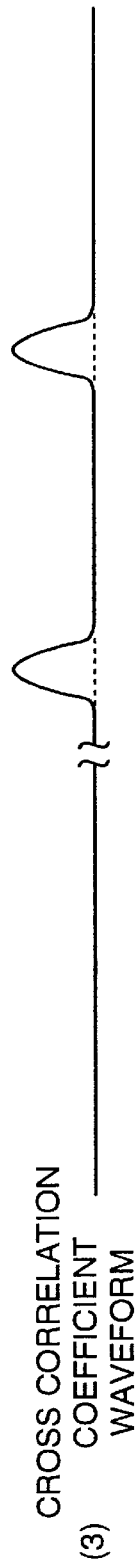
(1) OUTGOING PULSE
EXAMPLE STORED ECHO TEMPLATE
FIG. 6A
(2) SAMPLED RETURN ECHO WAVEFORM
(3) CROSS CORRELATION COEFFICIENT WAVEFORM
EXAMPLE WAVEFORMS
FIG. 6B

ULTRASONIC THERMOMETER SYSTEM

BACKGROUND OF THE INVENTION

This invention relates to a system used for measuring and monitoring temperature using ultrasonic thermometry, and more particularly to a system that measures temperature using solid rods of material that function as the temperature sensor.

Currently, thermocouples are used extensively in the monitoring of industrial process temperatures. Thermocouples are a pair of bare wires, each of which may be in the range of 0.005" to 0.030" in diameter, made from two dissimilar metals, joined at one end to form a temperature sensitive electro-voltaic junction. The junction at the tip of the wires is the part of the thermocouple that is used to perform the temperature measurement. The thermocouple assembly, generally constructed as a long, rod-like assembly, is typically from ⅛ inch to 1 inch in overall diameter, with a functional length of from 1 or 2 inches, to several feet. It is partially inserted into the process, the temperature of which is being measured, with the temperature-sensitive junction at the tip being placed in the area of interest in the process. Access to the process is typically obtained via a port in the furnace or reactor in which the process is occurring. The two open ends of the wires at the other end produce a voltage curve that is a function of temperature. The voltage curve produced for a given range of temperatures is primarily a function of the types of dissimilar metals, and the accuracy or calibration of it is primarily a function of the purity of the alloys used to make the thermocouple.

The most widely used thermocouples for measuring high temperatures are platinum/rhodium alloy combinations, theoretically useful for measuring temperatures up to 1,700 C. in oxidizing or inert environments, and tungsten/rhenium alloy combinations, theoretically useful for measuring temperatures up to 2,300 C. in vacuum, inert, or reducing environments. The bare thermocouple wire pairs are usually separated along their length by insulation packing or ceramic beads that are strung along the length of the wires. The thermocouples are often sheathed in a protection tube, and the protection tube is sometimes purged with an inert gas to increase thermocouple lifetime. Both thermocouple types have relatively short lifetimes. They also have increasing end-of-life inaccuracies due to inadvertent oxidation, reduction, or other chemical adulterations to the relatively fine wire alloys or electro-voltaic junction from temperature and process exposure. Additional inaccuracies are introduced as the ceramic insulation becomes increasingly conductive at higher temperatures, thus shunting the small voltage produced by the thermocouple. Thermocouples additionally are susceptible to electromagnetic interference often found in industrial environments, which adds uncertainty and error to such measurements.

As mentioned previously, thermocouple wires are typically in the range of 0.005" to 0.030" in diameter. Because of their small physical diameter, they are readily susceptible to chemical attack and performance degradation. Thermocouple wires can be made larger, however the cost at $5 to $35 per inch, depending on type and wire gauge, is prohibitive for industry-standard high temperature platinum/rhodium or tungsten/rhenium wire pairs greater than the mentioned diameter range.

Ultrasonic thermometry can substantially improve the shortcomings of the industry standard thermocouple. A major improvement is to lifetime and stability. This is accomplished by using a solid rod of material to measure the temperature rather than two thin dissimilar metal wires. This bare sensing rod is much more substantive than bare thermocouple wires, being approximately in the range of 0.100" to 0.250" in diameter, and is similar in functional length to the thermocouple. The ultrasonic thermometer rod is directly substituted into the same process as the thermocouple that it physically replaces. The larger physical size of the bare temperature-sensing rod material, along with selecting application compatible rod materials or materials resistant to very high temperatures, provide a much greater lifetime than with thermocouples. Additionally, the lower cost of ultrasonic thermometer rod material, in the range of $1 to $4 per inch, is much more favorable than that of the high temperature thermocouple wire that it replaces.

Ultrasonic thermometry relies on the fact that the speed of sound in a solid is a function of temperature. The propagation velocity of ultrasound in a solid material is a function of both the density and the modulus of elasticity of the material, both of which are functions of temperature. In a long, solid rod of material, the mathematical relationship can be expressed as $V_e=\mathrm{SQRT}(E(t)/P(t))$, where $V_e$ is the extensional wave velocity in a long rod, SQRT is square root, $E(t)$ is Young's modulus as a function of temperature, and $P(t)$ is density as a function of temperature. This physical phenomenon is the basis of ultrasonic thermometry.

Ultrasonic thermometer systems exist that measure temperature with solid rods of material that function as the temperature sensor. Such systems have used both pulse-echo or continuous wave techniques to measure temperature. Examples of pulse-echo systems and temperature sensing probes are shown and described in U.S. Pat. No. 4,772,131 issued to Varela et al, U.S. Pat. No. 4,483,630 issued to Varela, U.S. Pat. No. 3,597,316 issued to Lynnworth, U.S. Pat. No. 3,540,265 issued to Lynnworth, U.S. Pat. No. 3,633,424 issued to Lynnworth, and U.S. Pat. No. 3,717,033 issued to Gordon et al. These ultrasonic thermometer systems and probes generally function by coupling a short ultrasonic pulse into the probe rod with a transducer. Along the length of the rod, circumferential grooves are cut which reflect some of the ultrasonic energy back to the transducer, thus creating an echo signal. These systems rely upon accurately measuring the time between two return pulses as the representative measure of temperature. Two such reflected or echo signals from two adjacent grooves, or a signal from one groove and a signal from the end of the rod, establish a temperature zone. As the temperature of the zone changes, the transition time of the ultrasonic pulse through the zone also changes, thus providing a measurable indication of average temperature and changes in average temperature of the temperature zone defined by the reflections. A zone may be from less than an inch to many inches in length.

The time position of the return pulses in prior art has been established (a) by comparing the pulses to a threshold that is above the noise level, thus triggering a comparator, (b) by detecting a zero crossing of the reflected signals after crossing a threshold, or (c) by some combination of these techniques. In all cases, these systems attempt to establish the accurate time position of the peaks in the energy of the reflected pulses relative to a clock, but only do so indirectly by either setting a threshold somewhere below the actual reflected energy peak, or by detecting an event like a zero crossing that occurs before or after the actual peak. These systems have inherent inaccuracies in that the peak widths or slopes may change due to external factors not related to the temperature being measured, thereby causing an apparent change in measured temperature, which is actually an error. Such inaccuracies can be caused by environmental thermal effects on the exciting transducer, shifts in the superposition of the composite multi-axis components of the transducer response relative to each other, or electromagnetic noise.

In the known systems described above, no mechanism is provided for conveniently delivering the temperature calibration with the probe when it is installed or replaced by the user of such a system. Nor is any provision made for temperature compensating the probe response due to changes in ambient environmental temperature changes.

Further compromising the performance of prior art ultrasonic thermometers has been the complexity of the reflected waveforms, especially in pulse-echo systems. In pulse-echo systems, a single short pulse, perhaps 0.1 to 10 microseconds wide, is sent down the length of the sensing rod. This ultrasonic energy then reflects off the notches and the end of the rod, creating the echo reflections that are then processed to extract the timing information necessary to establish the temperature of the zone. The accuracy of such measurements is severely altered by a number of unavoidable effects that have plagued prior art systems including: 1) there is a limited ability to create a perfectly sinusoidal or perfectly square pulse with which to drive the transducer because of parasitic capacitances and inductances, 2) natural ringing in the acoustic system can only be damped to a limited degree, 3) mode conversion of the pulse as it travels down the length of rod converts from a primarily extensional wave at creation at the transducer to a multi-modal waveform by the time it makes a "round trip" down the rod and back to the transducer, and 4) dispersion of the square pulse as different frequencies and harmonics in the initial pulse travel at slightly different velocities thereby degrading the "squareness" of the initial pulse. These effects all combine to make the signal processing of the reflected waveforms a complex one. Simple techniques used by prior art systems, such as detecting zero crossings and crossing fixed thresholds, cannot hope to properly extract the precise timing information that is required given the complexity of the reflected waveforms.

U.S. Pat. No. 4,215,582 issued to Akita is an example of a continuous wave ultrasonic thermometer system that measures temperature by comparing the phase difference caused by temperature changes in two continuously received signals. Although it uses a different technique from the present invention, no provision is disclosed or suggested for the calibration of the temperature sensors or for conveniently delivering the calibration with the probe when it is installed or replaced by the user of such a system.

The rod materials used in the present invention are selected to be have high stability of their grain structures at their operating temperatures and environments for extended periods. In prior art systems, such as the device described in U.S. Pat. No. 3,350,942, high temperature materials are listed and acoustic properties are referenced, however the stability of grain structure over time and temperature are not considered. Change in grain structure through grain growth will cause a permanent change in the ultrasound velocity within the sensing rod and thus cause an apparent shift in measured temperature.

There have been past attempts to commercialize some of the ultrasonic thermometry systems described above, but none have been successful. Primitive signal processing that cannot properly process the complex signals involved in making an ultrasonic thermometer measurement, or is difficult to maintain adjustment have been major difficulties to overcome. Difficulty in installing probe calibration information, and the inability to integrate easily with an existing thermocouple monitoring infrastructure have made trials of an unproven ultrasonic temperature measurement technology difficult to evaluate by potential commercial customers. Thermal or electromagnetic environmental susceptibilities and unreliable operation have resulted from poorly designed signal processing circuitry. Unrepeatable results and temperature shifts with repeated use have resulted from improperly selected or prepared materials used as the sensing rod elements. High costs have resulted due to overly complex electronic hardware systems making the products less attractive to potential buyers. These are some of the key factors that have contributed to the lack of commercial success with prior art systems described above.

It is therefore a principal object of the present invention to provide an ultrasonic thermometer system that produces repeatable, reliable and accurate high temperature measurements over long periods in severe chemical environments found in industrial processes using more sophisticated signal processing.

Another object of the present invention is to provide an ultrasonic thermometer system that compensates its temperature measurements for changes in the ambient temperature of the transducer within the temperature measurement probe, and that also compensates for probe-to-probe variations in signal amplitude that arise from small differences in the transducer material, construction techniques, or other manufacturing variations.

Another object of the present invention is to provide an ultrasonic thermometer system that uses high temperature, grain-stable materials in the sensing element with lifetimes that exceed the lifetimes of the thermocouple sensing elements that they replace by a factor of 3 to 10.

A still further object of the present invention is to provide an ultrasonic thermometer system that easily integrates into existing temperature monitoring infrastructures by providing ultrasonic thermometer probes that are easily replaced without the user worrying about calibration, and that may provide as one of its outputs, a thermocouple-compatible output that will attach to a variety of temperature monitoring systems that use a thermocouple as an input.

SUMMARY OF THE INVENTION

The ultrasonic thermometer system of the present invention is generally a rod or probe of high temperature, grain-stabilized material that has a magnetostrictive or piezoelectric transducer bonded to one end. The transducer is excited by a transducer driver, creating short, periodic, ultrasonic pulses that travel down the length of the rod in a "pulse-echo" fashion. Along the length of the rod, circumferential grooves (notches) are cut which reflect some of the ultrasonic energy back to the transducer thus creating a reflected or echo signal. Two such reflected signals from two adjacent grooves, or a signal from one groove and a signal from the end of the rod, establish a temperature zone. This is the zone of interest to the user, which would be inserted into the user's process that needs to have the temperature monitored. As the temperature of the zone changes, the transition time of the ultrasonic pulse through the zone also changes, thus providing a measurable indication of average temperature and changes in average temperature of the temperature zone. There may be one or multiple temperature zones on one rod.

The probe head electronics amplifies, filters, and performs other signal conditioning functions on the signal of the reflected pulse. This reflected signal is then digitized, keeping accurate track of positioning in time. A digital processor then performs further filtering, signal conditioning, noise reduction, and analytical functions on the digitized signal. These functions include, among other things, short and long term signal averaging, level and temporal thresholding, and correlation and filtering. During the correlation processing, the digitized reflected signal is compared with a correlation template that resembles the shape of the expected reflected signal. The processor correlates the template to the reflected temperature zone boundary signals to precisely establish their position in time and changes in their position in time. There can be one or more echo templates used, i.e. each notch may have its own template or a set of notches may share a common template. The use of correlation techniques to determine notch echo timing provides a great improvement over prior art systems in noise reduction and immunity from other external environmental effects on the echo signals. It also takes into account and corrects for echo pulse decomposition due to propagation mode conversion and signal dispersion, conditions that prior art systems were unable to correct. The calibration information contained in the replaceable probe assembly is read and stored by the processor, providing the necessary information for the processor to determine the average temperature of the temperature zone or zones, given the dimensions of the zone or zones, the material from which the probe is made, and the signal template itself.

The processor, using a look-up table, interpolation between calibration points, curve fit equation of the probe material, or other means commonly used in the art, converts the temperature zone timing information into absolute temperature readings and sends them in digital form to the probe head's data connector. This digital information may optionally be sent to a transmitter, a computer, or any other digital control or display device. The transmitter would, for example, convert the digital representation of temperature to a visual display, and/or into an analog output that is linear, or that follows the calibration curve of the popular platinum-rhodium, tungsten-rhenium, or other thermocouple types. The digital output from the head can also be converted into other forms of analog or digital output, such as 4–20 mA, 0–10V, or the like. The digital output from the probe head electronics may also be used directly without further conversion.

These and other features and objects of the present invention will be more fully understood from the following detailed description which should be read in light of the accompanying drawings in which corresponding reference numerals refer to corresponding parts throughout the several views.

BRIEF DESCRIPTION OF THE DRAWINGS

FIG. 6 is a set of graphs of example waveforms of signals and stored data.

DETAILED DESCRIPTION OF THE PREFERRED EMBODIMENT

Figure 1:
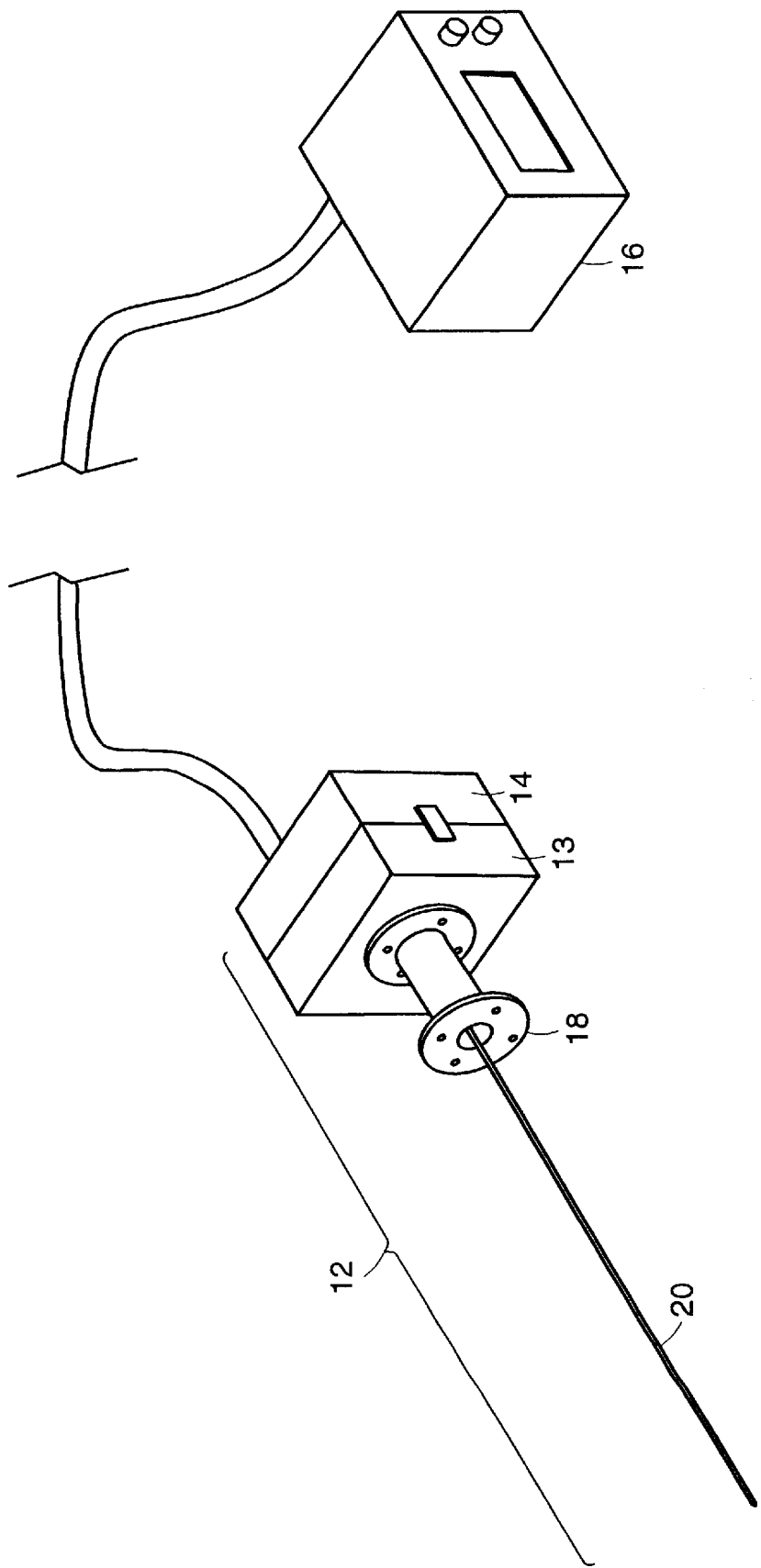
FIG. 1 is a perspective view of the main components of the ultrasonic thermometer system of the present invention.

The present invention is a novel ultrasonic thermometer system for monitoring high temperatures for extended periods in harsh industrial environments. Referring to FIG. 1, the ultrasonic thermometer system 10 includes a replaceable probe assembly 12, a head box 14, and a transmitter, a computer, or any other digital control or display device 16. The replaceable probe assembly 12 is the component of the system whose temperature measurement end is inserted into the high temperature, harsh environment. Once the probe assembly 12 needs to be replaced, the customer would replace only the probe assembly 12 and not the head box 14. Unlike previous ultrasonic thermometer systems, with the present invention, the probe 12 can be replaced without the need for individual calibration of the probe greater than the calibration for a standard thermocouple. The reusable mounting flange 18 is an ancillary mechanical mounting means that simply permits the temperature measurement apparatus to be attached to the process equipment that requires temperature measurement. The shape of the flange will depend on the equipment to which it is attached.

In the preferred embodiment, the replaceable probe rod 20 is constructed of high temperature material of approximately 0.060" in diameter to 0.250" in diameter, and may be several inches to perhaps 2 or 3 feet in length depending on the depth requirements of the particular process being measured. Such a material may be a ceramic such as alumina with a purity of greater than 99.8%, density of 3.96 or greater, with zero porosity, and a firing temperature of 1,750° C. or greater. Grain stabilization with the addition of magnesia in the range of 50 to 400 ppm, is desirable to maximize the life of the sensing rod. High purity, grain stabilized polycrystalline aluminum oxide can also be used as the material for the rod. Grain stabilization inhibits the growth of the grains in the microstructure of the material at high temperatures. This keeps the acoustic transmission properties of the sensing rod stable, therefore maintaining the stability of the calibration of the sensing rod. Suitable ceramics are those distributed by Coors Ceramics under the trade name Vistal or General Electric under the trade name Lucalox, Morgan Matroc and Saphikon also sell acceptable ceramic materials for the rod. Other high-temperature materials may be selected with other special characteristics such as ones that can be used at higher temperatures or that must be chemically compatible with a particular process. An example of this is graphite such as Grade 2123 that is distributed by Carbone America, or grain-stabilized metals such as tantalum, grain-stabilized with yttria that is distributed by H. C. Starck. The propagation velocities of extensional ultrasound waves in long rods of these materials may range from 2,000 meters per second to 12,000 meters per second.

Figure 3:
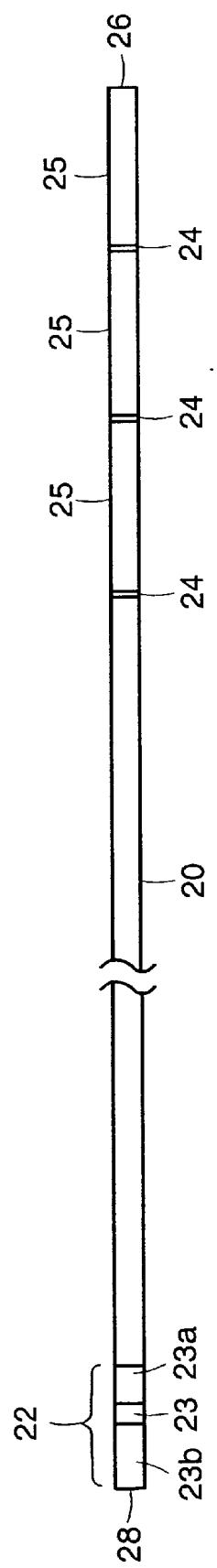
FIG. 3 is a plan view of the probe and transducer assembly shown in FIG. 2.

Referring to FIG. 3, a piezo ceramic or magnetostrictive transducer 22 is bonded to one end of the rod between an acoustic impedence matching element 23a and an acoustic damping element 23b. The transducer 23 transmits and receives the ultrasonic pulses. Piezo-ceramic transducers are distributed by many companies including Morgan Matroc under such trade names as PZT5A and PN1, and Keramos under such trade names as K270 and K81. Magnetostrictive transducers may be manufactured from remendur or permendur cobalt-iron alloys such as is distributed by Carpenter Technology. The acoustic impedance matching element 23a matches the acoustic impedance of the transducer 23 to the acoustic impedance of the rod 20 to better couple the acoustic energy into the rod 20. The acoustic damping element 23b eliminates unwanted reflections from the opposite side of the transducer 23.

A circumferential groove 24 is cut in the rod 20 a short distance (for example 0.5" to 3") from the other end 26 of the rod 20. This groove establishes a zone, the temperature of which will be measured, between itself and the flat end 26 of the rod 20. The groove maybe 0.005"to 0.030" wide, and from a depth as shallow as 0.005" to a depth that may be 25% of the thickness of the rod. There may be more than one groove 24 to establish several temperature measurement zones 25 along the length of the rod 20. These temperature measurement zones may range from fractions of an inch to perhaps many inches long.

Figure 2:
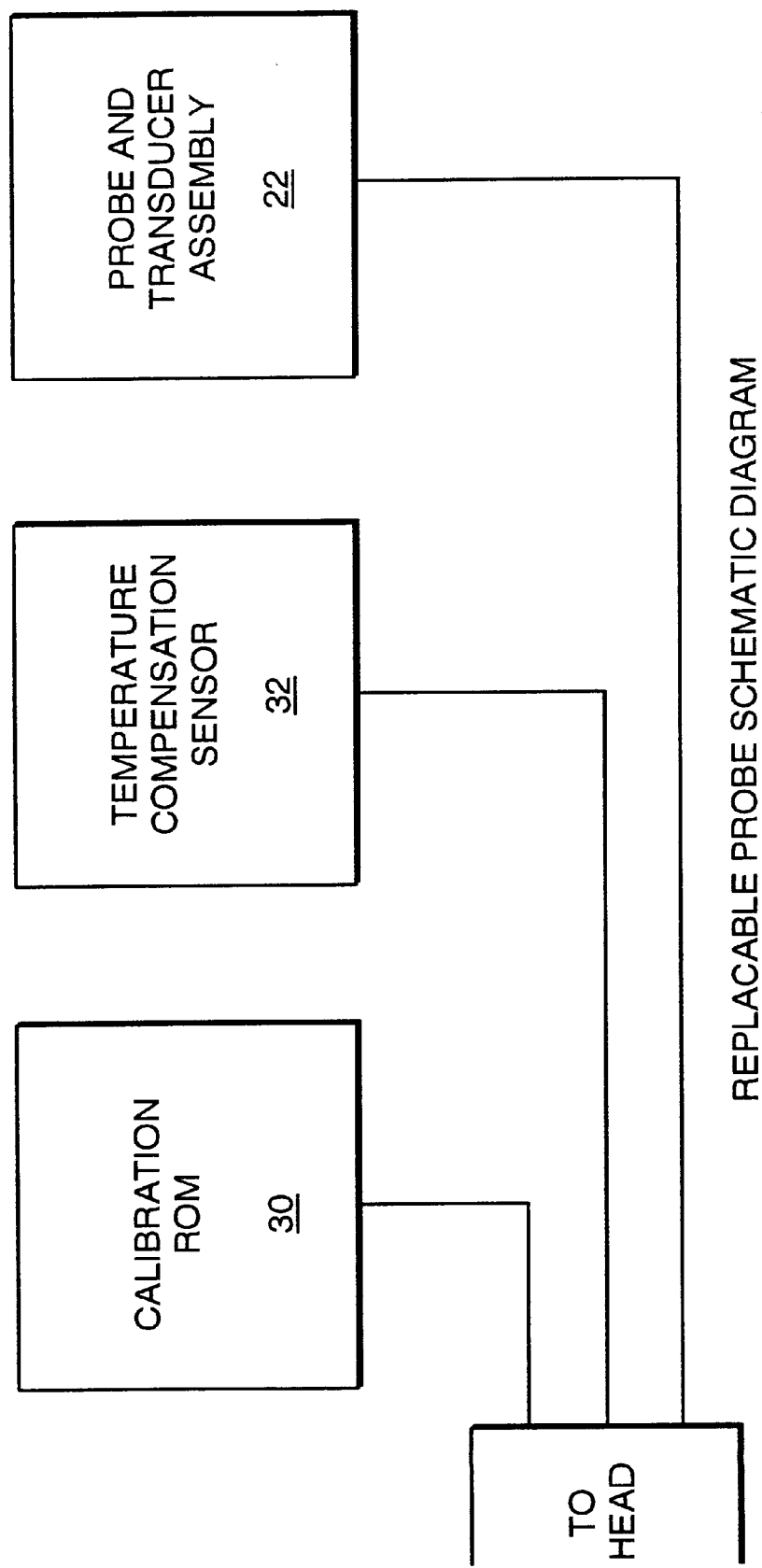
FIG. 2 is a schematic diagram of the replaceable probe assembly shown in FIG. 1.

Referring to FIGS. 1 and 2, within the housing of the replaceable probe assembly 12, hidden from view of the user, is a calibration read-only-memory (ROM) 30 that contains encoded information about the individual probe to which it is attached. This information may include data such as the number of zones, key timing information about the time for the ultrasonic pulse to reach the first groove and then the second groove of each temperature zone at specific temperatures of calibration of the individual probe, thus containing the critical calibration information that prior art systems simply did not address. It is this self-contained calibration information contained in each probe that makes the ultrasonic thermometer system 10 of the present invention as simple to use for the customer as replacing a thermocouple.

The calibration ROM 30 may also contain a template or templates of the shape of the waveform that the reflections create. Additional information that the ROM 30 may contain is the ambient temperature of the probe transducer at which the probe was calibrated, the serial number of the probe, and the type of material from which the probe is made.

Transducers often are susceptible to changes in environmental conditions such as ambient temperature. Such susceptibility can cause the displayed measured parameter to erroneously show changes in value where there is no change in the measured parameter itself, thus creating an error. Referring to FIG. 2, the preferred embodiment of the ultrasonic thermometer system 10 of this invention contains a temperature compensation sensor 32 within the replaceable probe assembly housing 13. It is physically located in the near vicinity of the piezo or magnetostrictive transducer to monitor ambient temperature and to report it to the head box 14. The head box 14 uses this information to calculate the change in the transducer's ambient temperature from the temperature at which the probe and transducer assembly 22 was calibrated. It then compensates for known errors that such changes will cause in the displayed temperature by using compensation data stored in the calibration ROM 30. This technique, uniquely applied to the ultrasonic thermometer of the present invention, eliminates many of the problems previously encountered by users of ultrasonic thermometry since prior art devices made no effort to correct this source of drift and error.

Figure 4:
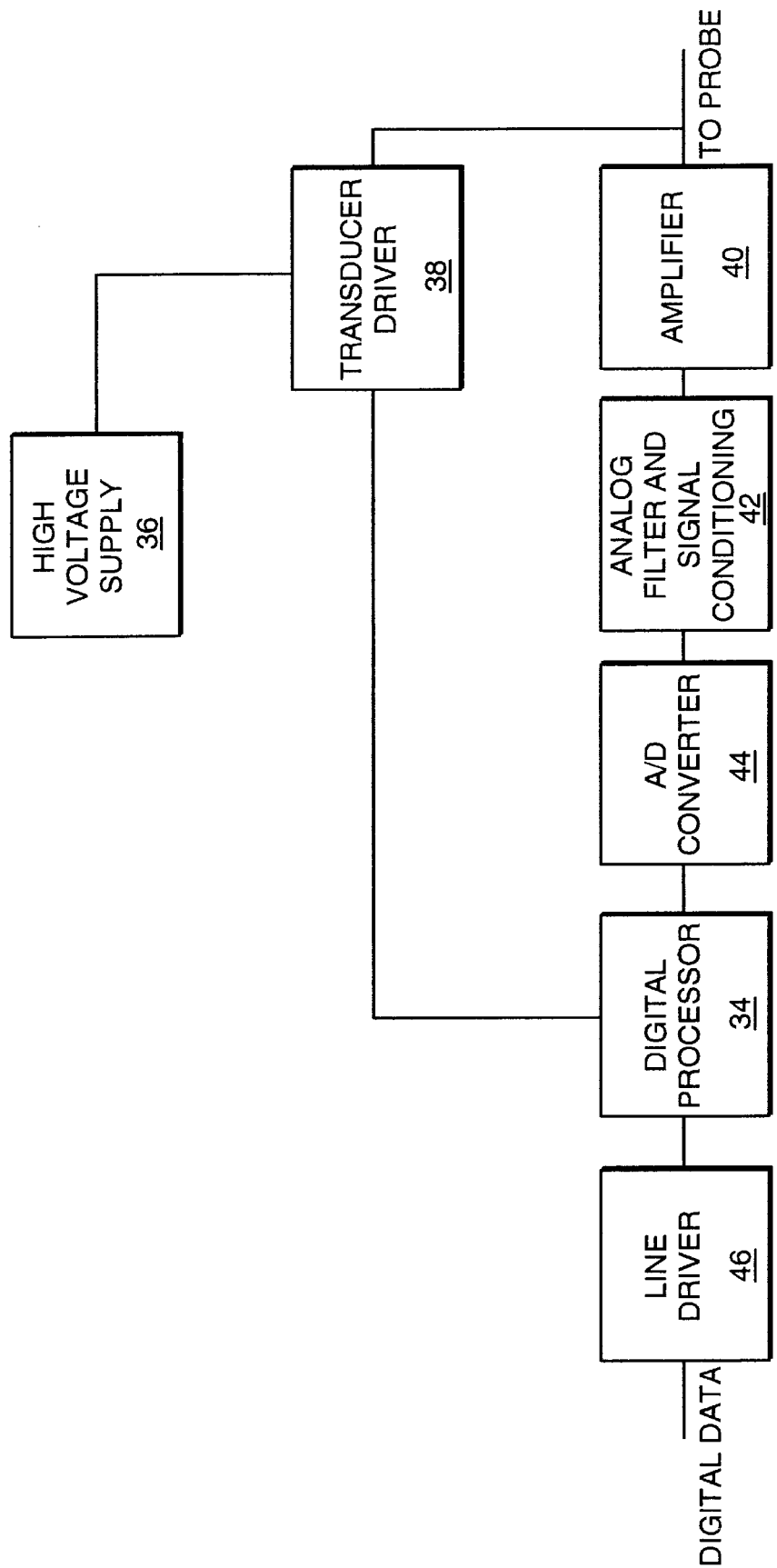
FIG. 4 is a block diagram of the head end components shown in FIGS. 1.

Referring to FIG. 4, the preferred embodiment of the head box 14 contains a central processor such as a general purpose digital signal processor (DSP) 34 that may be of the type manufactured by Motorola, Texas Instruments, Analog Devices or others well known in the industry. The head box 14 also contains a high voltage power supply 36, perhaps 50 volts to 500 volts DC, that supplies the voltage necessary for the transducer assembly to create an ultrasonic pulse. Also included is transducer drive circuitry 38 to drive the transducer assembly 22 with a pulse that may be from 500 nanoseconds to 10 microseconds in duration. Receiving the ultrasonic echo signals from the circumferential groove or grooves 24 and from the flat end of the rod 26, is an amplifier 40 and filter 42 that amplifies the size of the reflected waveforms and filters it to control its bandwidth. The amplified signal is then sampled and digitized by an analog to digital converter (A/D) 44 that may be of the type manufactured by Burr-Brown, Texas Instruments, Analog Devices or others well known in the industry.

The DSP 34 performs all of the command and control for the system as well as performing the necessary data taking, data manipulation, and data conversion.

On system power up, the DSP 34 runs a self diagnostics. If this passes, it then reads and internally stores the data in the attached probe's calibration ROM 30. Any errors encountered during these steps are reported out as a digital code using the head's line driver 46. If everything is normal at this point, the DSP 34 begins standard operations.

The DSP 34 begins a cycle by first commanding the transducer driver 38 to send a high voltage pulse of known duration and shape to the transducer 23 in the probe and transducer assembly 22. This causes an ultrasonic pulse to be sent down the length of the probe's temperature sensing rod 20. After waiting for a probe specific transit time for the echo signals to arrive back at the transducer 23, the DSP 34 begins taking digitized echo waveform data from the A/D converter 44 and storing it in its internal memory. It will continue to store data until a probe specific number of samples have been captured. This block of data represents a single sample run. This block of data is then used by the DSP 34 during data manipulation.

Figure 5:
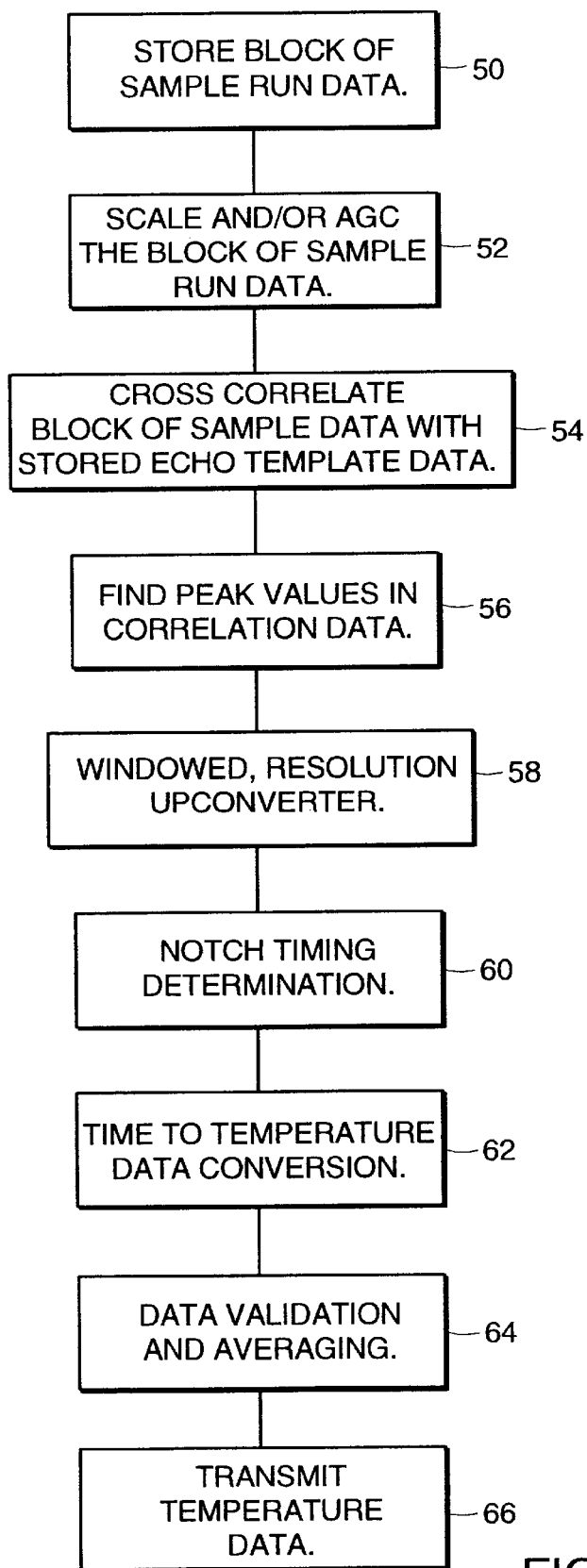
FIG. 5 is a flow chart of the processor data manipulations performed by the processor of the untrasonic thermometer system shown in FIG. 1.

FIG. 5 shows the flow of the DSP's data manipulations. In step 50 the DSP 34 stores a stored block of data from the latest sample run (also see FIG. 6(b)(2)) and scales this data in step 52. This is done to eliminate probe-to-probe signal amplitude variations, a significant problem in prior art systems. The DSP 34 scales the signal size to a constant level using a scaling and/or Automatic Gain Control (AGC) technique. The AGC can use one of many standard methods that are well known in the industry. This eliminates the necessity to manually adjust the signal amplitude of each probe 12, keeps the changing of probes 12 simpler for the customer, and augments the temperature compensation capability of the system by making final adjustments in run-time signal level changes before more critical signal processing begins. If desired, data from multiple sample runs can be averaged here for further noise reduction. The result of the scaling/AGC stage is then cross correlated in step 54 with the stored probe specific echo template(s) (also see FIG. 6(a)).

The cross correlation calculates a correlation coefficient for each data point in the scaled block of sample run data. These coefficients are stored in a cross correlation coefficient buffer (see FIG. 6(b)(3)). The correlation coefficients are calculated using the equation:

$$\rho_{sy(t)} = \frac{(1/n)\sum_{i=1}^{n}[(s(i+t) - u_s(t))(y(i) - u_y(0))]}{\sigma_s(t)\sigma_y(0)}$$

Were:

s(x)=stored block of sampled echo data y(x)=stored echo template data $$u_x(t) = (1/n)\left[\sum_{i=1}^{n} x(i+t)\right]$$

$$\sigma_x(t) = \sqrt{(1/n)\sum_{i=1}^{n} (x(i+t) - u_x(t))^2}$$

After the correlation data is complete, the data in the cross correlation coefficient buffer is studied to find its peak values in step 56. The amplitude peaks in the correlation data are identified. Since the correlation coefficients represent the probability that the next N sample run data samples exactly match the expected echo template, the peaks in the correlation waveform represent the most likely location in time of the notch and end reflections. Since the time between data samples is accurately known, the time between notch echoes can then be determined.

To increase timing accuracy to finer than the sample to sample interval, the data is next processed by a windowed resolution upconverter in step 58. This section takes the peak correlation samples found by the peak locator in step 56 and expands the sample resolution around those points by perhaps 2 to 200 times using industry standard sample rate conversion techniques. The advantage to sample rate upconverting only within a window of the peak locations is that a dramatic increase in timing resolution can be achieved with only a relatively minor increase in processor memory and running time.

The location of the peaks and their upconversion are then used to determine the notch timing in step 60. Here the high resolution notch echo times are used to determine the notch to notch or zone transit times. In step 62 this timing information is then used for time-to-temperature data conversion.

Temperature changes in the temperature zone of the probe, as represented by the change in zone transit time of the ultrasonic pulse, depend upon the type of probe material and the length of the zone. The range may be from 0.1 nanoseconds or less to 10 nanoseconds or more of ultrasonic pulse zone transition time change per degree Celsius change in average zone temperature. The time-to-temperature data conversion performed in step 62 can be accomplished using a look-up table, interpolation between calibration points, curve fit equation of the probe material, or other means commonly used in the art. The preferred embodiment uses a multi-region curve fit to convert the temperature zone timing information into absolute temperature readings using probe specific coefficients and region switch points.

Once the zone temperature data is calculated, it is validated and averaged in step 64 to further increase data accuracy and stability.

The final temperature data is then formatted and sent out as absolute temperature readings in digital form in step 66. Referring to FIG. 4, this digital data is sent through the line driver 46 and then leaves the head box unit. This digital information may optionally be sent to a transmitter, a computer, or any other digital control or display device.

While the foregoing invention has been described with reference to its preferred embodiments, various alterations and modifications will occur to those skilled in the art. All such alterations and modifications are intended to fall within the scope of the appended claims.

We claim:

1. An ultrasonic thermometer system comprising:
   a solid rod of grain stable material, said rod having one or more circumferential grooves cut through the surface of the rod;
   a transducer bonded to one end of said rod;
   a head box for amplifying, filtering and conditioning signals generated by said transducer;
   a processor for correlating signals generated by said transducer and reflected by said grooves with a waveform template to determine periods in time where peak reflected energy occurs and to generate a temperature reading based on said periods in time where the peak reflected energy occurs, said waveform template being a single waveform template unique to said rod.

2. The ultrasonic thermometer system of claim 1 further comprising a read-only memory mounted in a housing attached to said solid rod, said read-only memory including encoded information about said rod.

3. The ultrasonic thermometer system of claim 2 wherein said information is calibration information that is specific to said rod.

4. The ultrasonic thermometer system of claim 1 further comprising a temperature compensation sensor mounted in close proximity to said rod in a housing attached to said solid rod.

5. The ultrasonic thermometer system of claim 1 further comprising an automatic gain circuit mounted in said head box for keeping signal levels constant to eliminate manufacturing variations.

6. The ultrasonic thermometer system of claim 1 wherein said grain stable material is a high purity, grain stabilized polycrystalline aluminum oxide.

7. The ultrasonic thermometer system of claim 3 wherein said waveform template is a correlation waveform template which is specific to said rod to which said read-only memory is connected.

8. The ultrasonic thermometer system of claim 2 where in said calibration information is information identifying the material out of which said rod is manufactured.

9. An ultrasonic thermometer system comprising:
   a solid rod of grain stable material, said rod having one or more circumferential grooves cut through the surface of the rod;
   a transducer bonded to one end of said rod;
   a head box for amplifying, filtering and conditioning signals generated by said transducer;
   a processor for correlating signals generated by said transducer and reflected by said grooves with waveform templates to generate a temperature reading, said waveform templates being a plurality of waveform templates with one unique waveform template being assigned to each of said grooves.

10. The ultrasonic thermometer system of claim 9 further comprising a read-only memory mounted in a housing attached to said solid rod, said read-only memory including encoded information about said grooves in said rod.

11. The ultrasonic thermometer system of claim 10 wherein said information is calibration information that is specific to said grooves in said rod.

12. The ultrasonic thermometer system of claim 9 further comprising a temperature compensation sensor mounted in close proximity to said rod in a housing attached to said solid rod.

13. The ultrasonic thermometer system of claim 9 further comprising an automatic gain circuit mounted in said head box for keeping signal levels constant to eliminate manufacturing variations.

14. The ultrasonic thermometer system of claim 9 wherein said grain stable material is a high purity, grain stabilized polycrystalline aluminum oxide.

15. The ultrasonic thermometer system of claim 11 wherein said waveform templates are correlation waveform templates which are specific to said grooves in said rod to which said read-only memory is connected.

16. The ultrasonic thermometer system of claim 10 where in said calibration information is information identifying the material out of which said rod is manufactured.

17. A method of determining temperature using an ultrasonic thermometer system that includes a solid rod of grain stable material, said rod having one or more circumferential grooves cut through the surface of the rod and a transducer bonded to one end of said rod, said method comprising the steps of:

obtaining signals generated by said transducer;

amplifying, filtering and conditioning signals obtained from said transducer;

correlating signals generated by said transducer and reflected by said grooves with a waveform template to determine periods in time where peak reflected energy occurs, said waveform template being a single waveform template unique to said rod;

generating a temperature reading based on said periods in time where the peak reflected energy occurs.

18. A method of determining temperature using an ultrasonic thermometer system that includes a solid rod of grain stable material, said rod having one or more circumferential grooves cut through the surface of the rod and a transducer bonded to one end of said rod, said method comprising the steps of:

obtaining signals generated by said transducer;

amplifying, filtering and conditioning signals obtained from said transducer;

correlating signals generated by said transducer and reflected by said grooves with waveform templates to determine periods in time where peak reflected energy occurs, said waveform templates being a plurality of waveform templates with one unique waveform template being assigned to each of said grooves;

generating a temperature reading based on said periods in time where the peak reflected energy occurs.

* * * * *